(12) United States Patent
Standke et al.

(10) Patent No.: US 7,135,245 B2
(45) Date of Patent: Nov. 14, 2006

(54) APPARATUS AND METHOD FOR STACK TEMPERATURE CONTROL

(75) Inventors: Michael Standke, Mainz (DE); Ingo Hermann, Mainz (DE)

(73) Assignee: General Motors Corporation, Detroit, MI (US)

( * ) Notice: Subject to any disclaimer, the term of this patent is extended or adjusted under 35 U.S.C. 154(b) by 531 days.

(21) Appl. No.: 10/439,699

(22) Filed: May 16, 2003

(65) Prior Publication Data

US 2004/0229096 A1     Nov. 18, 2004

(51) Int. Cl.
  *H01M 8/04*     (2006.01)
  *H01M 8/00*     (2006.01)
  *H01M 8/10*     (2006.01)
  *H01M 8/12*     (2006.01)
  *H01M 8/18*     (2006.01)

(52) U.S. Cl. .......................... 429/24; 429/26; 429/19; 429/32; 429/25; 429/38; 429/39; 429/13

(58) Field of Classification Search .................. None
See application file for complete search history.

(56) References Cited

U.S. PATENT DOCUMENTS

| | | | |
|---|---|---|---|
| 5,200,278 A * | 4/1993 | Watkins et al. ............... | 429/24 |
| 6,258,474 B1 * | 7/2001 | Diethelm et al. ............. | 429/26 |
| 6,861,167 B1 * | 3/2005 | Wells et al. .................. | 429/13 |
| 6,887,604 B1 * | 5/2005 | Suzuki et al. ................. | 429/20 |
| 2002/0136937 A1 * | 9/2002 | Kelley et al. ................. | 429/17 |
| 2002/0139119 A1 * | 10/2002 | Touchton et al. ............. | 60/772 |
| 2004/0191131 A1 * | 9/2004 | Wolf et al. .................. | 422/129 |

* cited by examiner

*Primary Examiner*—Patrick Joseph Ryan
*Assistant Examiner*—Karie O'Neill
(74) *Attorney, Agent, or Firm*—Harness, Dickey & Pierce, P.L.C.

(57) ABSTRACT

A system for modulating a temperature of one or more fuel cells in a fuel cell stack includes a catalytic combustor in heat exchange relationship with the fuel cell stack. The catalytic combustor promotes an exothermic reaction. A hydrogen source selectively supplies hydrogen ($H_2$) to the catalytic combustor. The $H_2$ reacts with oxygen ($O_2$) in the exothermic reaction. In one feature, the catalytic combustor lies adjacent to the fuel cell stack and includes a series of catalyst coated flow channels. In another feature, the catalytic combustor includes a plate having a catalyst layer and that is offset from the fuel cell stack. Heat to radiates from the catalytic combustor to the fuel cell stack. In still another feature, a jacket encloses the fuel cell stack to form a gap between the jacket and the fuel cell stack through which hot exhaust from the catalytic combustor circulates.

18 Claims, 2 Drawing Sheets

APPARATUS AND METHOD FOR STACK TEMPERATURE CONTROL

FIELD OF THE INVENTION

The present invention relates to fuel cells, and more particularly to a device to reduce fuel cell stack start-up time and maintain fuel cell stack temperature above 0° C.

BACKGROUND OF THE INVENTION

Fuel cell systems are increasingly being used as a power source in a wide variety of applications. Fuel cell propulsion systems have also been proposed for use in vehicles as a replacement for internal combustion engines. The fuel cells generate electricity that is used to charge batteries and/or to power an electric motor. A solid-polymer-electrolyte fuel cell includes a membrane that is sandwiched between an anode and a cathode. To produce electricity through an electrochemical reaction, a fuel, commonly hydrogen ($H_2$), is supplied to the anode and an oxidant, such as oxygen ($O_2$) is supplied to the cathode. The source of the oxygen is commonly air.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane. The electrons flow through an electrical load (such as the batteries or the electric motor) that is connected across the membrane. In a second half-cell reaction, oxygen ($O_2$) at the cathode reacts with protons ($H^+$), and electrons ($e^-$) are taken up to form water ($H_2O$).

For optimum operation, defined as high power output and quick power delivery, fuel cells need a certain operating temperature. Heat generated through the electrochemical reaction increases the operating temperature of the fuel cell. Excess heat is dissipated through a cooling system.

At sub-freezing temperatures (e.g. below 0° C. or 273K), however, starting the fuel cell quickly is more difficult due to frozen water in the fuel cell and the fact that the electrochemical reaction rate in the fuel cell is significantly reduced. This limits current flow and further heating of the fuel cell to the optimum operating temperature.

SUMMARY OF THE INVENTION

Accordingly, the present invention provides a system for modulating a temperature of one or more fuel cells in a fuel cell stack. The system includes a catalytic combustor in heat exchange relationship with the fuel cell stack. The catalytic combustor promotes an exothermic reaction. A hydrogen source selectively supplies hydrogen ($H_2$) to the catalytic combustor. The $H_2$ reacts with oxygen ($O_2$) in the exothermic reaction.

In one feature, the hydrogen source supplies the $H_2$ based on a temperature of the fuel cell stack.

In another feature, the system further includes a flow regulator selectively supplying the $H_2$ from the hydrogen source to the catalytic combustor. The flow regulator is modulated based on a pressure of the hydrogen source. A heater heats the hydrogen source to increase the pressure thereby increasing flow of the $H_2$ through the flow regulator.

In another feature, the catalytic combustor lies adjacent to the fuel cell stack and includes a series of catalyst coated flow channels through which the $H_2$ and the $O_2$ flow.

In still another feature, the catalytic combustor includes a plate having a catalyst layer and that is offset from the fuel cell stack. The $H_2$ and the $O_2$ flow over the catalyst layer to induce the exothermic reaction causing heat to radiate from the catalytic combustor to the fuel cell stack.

In yet another feature, a jacket encloses the fuel cell stack to form a gap between the jacket and the fuel cell stack. Hot exhaust from the catalytic combustor circulates through the gap to heat the fuel cell stack.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
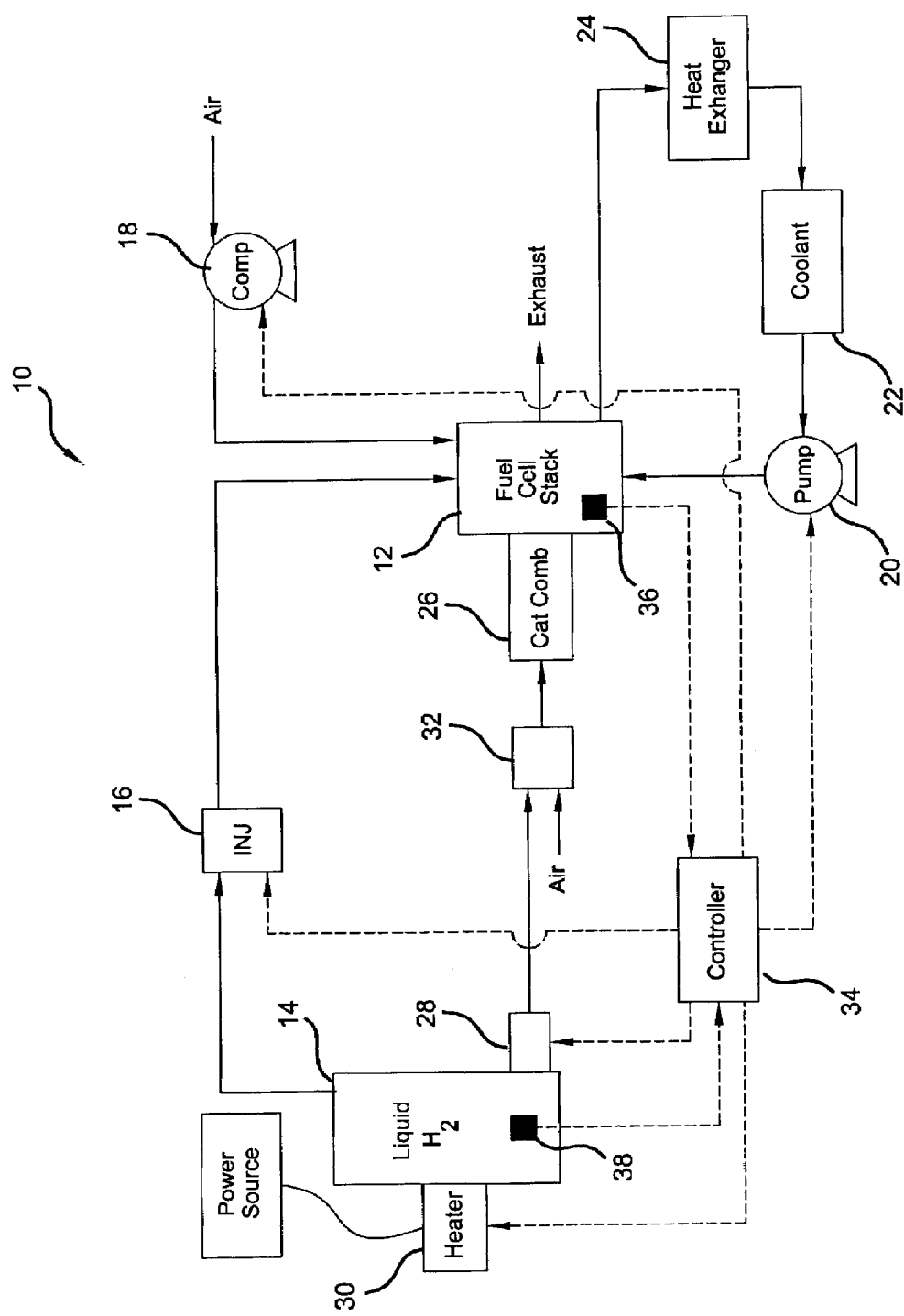
FIG. 1 is a schematic illustration of a fuel cell system including a fuel cell stack according to the principles of the present invention.

Referring now to FIG. 1, a fuel cell system 10 is shown. The fuel cell system includes a fuel cell stack 12 that is supplied with hydrogen ($H_2$) from a hydrogen source 14. An injector 16 facilitates supply of $H_2$ from the hydrogen source 14 to the fuel cell stack 12. A compressor 18 facilitates supply of oxygen ($O_2$) containing air to the fuel cell stack 12. $H_2$ is dissociated at an anode side of the fuel cell stack 12 to generate hydrogen protons ($H^+$) and electrons ($e^-$). The protons are transported through to a cathode side of the fuel cell stack 12 and the electrons flow through an electrical load (not shown). $O_2$ at the cathode side reacts with protons ($H^+$) and electrons ($e^-$) are taken up to form water ($H_2O$). $H_2O$ is exhausted from the fuel cell stack 12.

The reaction at the cathode side is exothermic. The heat generated by the exothermic reaction warms the fuel cell stack 12 to a desired operating temperature. The operating temperature is preferably 80° C. However, at 20° C sufficient current is immediately available from the fuel cell stack 12 to power the load.

Coolant is circulated through the fuel cell stack 12 to maintain the operating temperature of the fuel cell stack 12. Initially, in the start-up mode during which the fuel cell stack 12 is warming up to a desired operating temperature, the coolant circulates the heat to uniformly warm the fuel cell stack 12. Once the fuel cell stack 12 achieves the desired operating temperature, the coolant maintains the temperature. A pump 20 pumps coolant through the fuel cell stack 12 from a coolant source 22. The coolant is in heat exchange relationship with the various components of the fuel cell stack 12. The coolant exiting the fuel cell stack 12 flows through a heat exchanger 24 where heat from the fuel cell stack 12 is discharged to a heat sink, such as atmosphere.

A catalytic combustor 26 is associated with the fuel cell stack 12. As explained in further detail below, exothermic reactions within the catalytic combustor 26 generate heat to warm the fuel cell stack 12. The heat generated by the catalytic combustor 26 is used during a park mode to maintain the temperature of the fuel cell stack 12 above freezing (0° C.). The catalytic combustor 26 can also be used during the start-up mode to assist in raising the fuel cell stack temperature to the desired operating temperature.

The fuel cell system 10 further includes an exemplary flow regulator 28 associated with the hydrogen source 14. The flow regulator 28 can be a pressure relief valve. As pressure within the hydrogen source 14 exceeds a threshold pressure, $H_2$ is exhausted through the flow regulator 28 to reduce the pressure within the hydrogen source 14. A heater 30 is associated with the hydrogen source 14 and is operable to heat the hydrogen source 14. Heating of the hydrogen source 14 induces an increased pressure condition therein. The exhausted $H_2$ is fed into the fuel cell stack 12 through a flow control device 32. In one example, the flow control device 32 includes a venturi nozzle that concurrently draws in $O_2$ containing air from atmosphere. The $O_2$ containing air mixes with the gaseous $H_2$ and is fed into the fuel cell stack 12. As discussed in further detail below, an exothermic oxidization reaction occurs within the catalytic combustor 26 to heat the fuel cell stack.

A controller 34 is in electrical communication with various components and sensors of the fuel cell system 10. The controller 34 controls operation of the compressors 16,18 and the pump 20 to regulate operation of the fuel cell stack 12. A temperature sensor 36 generates a temperature signal indicating the temperature of the fuel cell stack 12. A pressure sensor 38 generates a pressure signal indicating a pressure within the hydrogen source 14. The controller 34 communicates with the flow regulator 28 to exhaust $H_2$ when the pressure within the hydrogen source 14 exceeds the threshold pressure. The controller 34 regulates operation of the heater 30 to selectively induce an increased pressure condition within the hydrogen source 14, as discussed in further detail below.

Figure 2:
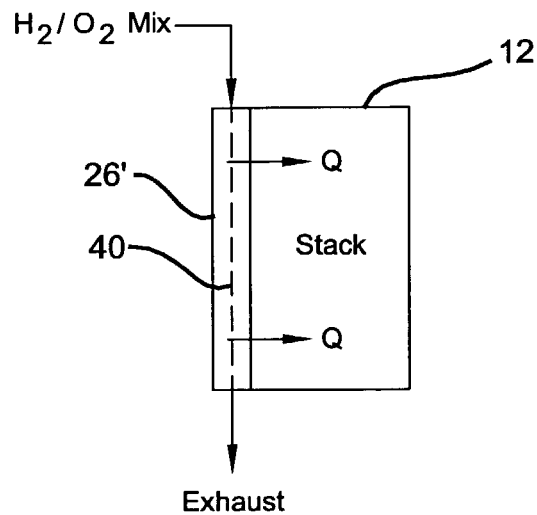
FIG. 2 is a schematic illustration of the fuel cell stack having an adjacent catalytic combustor according to the principles of the present invention.

Referring now to FIG. 2, a first configuration of the catalytic combustor 26 is shown and is indicated as 26'. The catalytic combustor 26' includes a series of flow channels 40 that are covered by a catalyst layer (not shown) and lies adjacent to the fuel cell stack 12. The $H_2$ and $O_2$ mix from the flow control device 32 flows into the flow channels 40 where the catalyst induces the exothermic oxidization reaction. Because the catalytic combustor 26' is in heat exchange relationship with the fuel cell stack 12, heat transfer (Q) occurs, warming the fuel cell stack 12.

Figure 3:
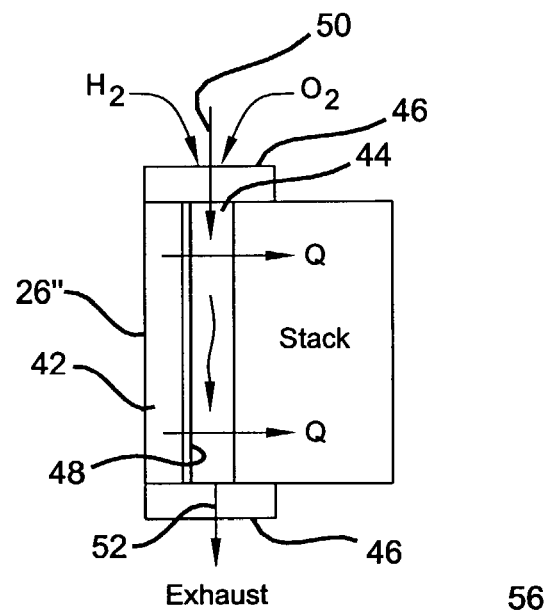
FIG. 3 is a schematic illustration of the fuel cell stack having a diffused radiant catalytic combustor according to the principles of the present invention.

Referring now to FIG. 3, a second configuration of the catalytic combustor 26 is shown and is indicated as 26". The catalytic combustor 26" functions as a diffused radiant heater and includes a substrate 42 that is offset by a gap 44 from the fuel cell stack 12. A housing 46 seals the gap 44 between the substrate 42 and the fuel cell stack 12. A face of the substrate 42 is coated with a catalyst layer 48. Gaseous $H_2$ and $O_2$ are fed into the gap 44 through an inlet 50 and contact the catalyst layer 48. The catalyst layer 48 induces the exothermic oxidization reaction. Heat transfer (Q) occurs across the gap 44 to warm the fuel cell stack 12. Cooled exhaust gas is exhausted from the gap through an outlet 52.

Although the illustration of FIG. 3 includes the catalyst layer 48 on the fuel cell stack side of the substrate 42, it is anticipated that other configurations are conceivable. For example, the catalyst layer 48 could be on the face of the substrate 42 facing away from the fuel cell stack 12. Heat transfer to the stack would then occur through the substrate 42 and across the gap 44 to the fuel cell stack 12. Although the heat transfer performance of such a configuration is not optimal, such a configuration is possible. Further, the illustration of FIG. 3 includes the catalytic combustor 26" positioned adjacent to one face of the fuel cell stack 12. It is anticipated, however, that the catalytic combustor 26" could be configured so as to include a substrate 42 with a catalyst layer 48 opposed to one ore more faces of the fuel cell stack 12 or even encompassing the entire fuel cell stack 12.

Figure 4:
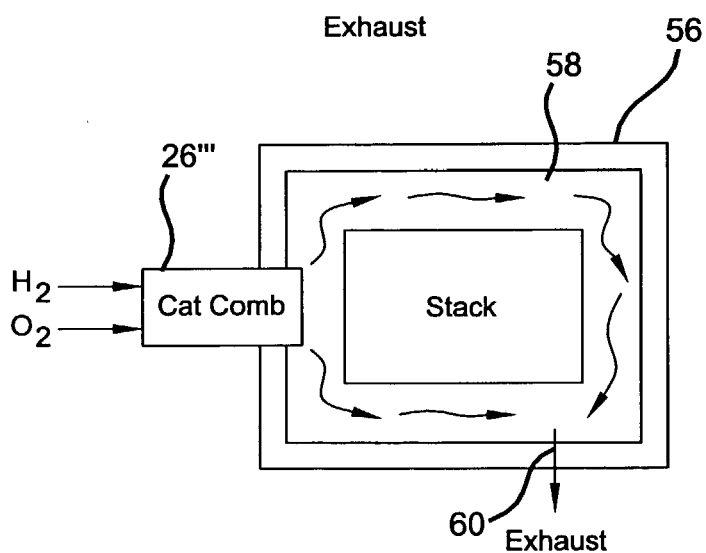
FIG. 4 is a schematic illustration of the fuel cell stack in an enclosure heated by a catalytic combustor according to the principles of the present invention.

Referring now to FIG. 4, a third configuration of the catalytic combustor 26 is shown and is indicated as 26'''. The fuel cell stack 12 is covered by an insulated covering or enclosure 56. The insulated covering 56 is formed of a synthetic cover or wrapping. There is a gap 58 between the insulated covering 56 and the fuel cell stack 12. It is anticipated however, that the insulated covering 56 could be defined by walls of a fuel cell stack compartment within which the fuel cell stack 12 is retained.

An exhaust end of the catalytic combustor 26''' extends into the gap 58 through the insulated covering. An $H_2$ and $O_2$ gaseous mixture are fed into the catalytic combustor 26''' through the flow control device 32. An exothermic oxidization reaction occurs generating hot exhaust gas including residual $O_2$, $N_2$ and $H_2O$. The exhaust gas flows about the fuel cell stack 12 in the gap 58 between the fuel cell stack 12 and the insulated covering 56, warming the fuel cell stack 12.

As the exhaust gas flows through the gap 58 and heat transfer to the fuel cell stack 12 occurs, the exhaust gas is cooled and the $H_2O$ vapor condenses. The gap 58 is configured to enable sufficient dwell time of the exhaust gas within the gap 58 so adequate heat transfer occurs. The cooled exhaust gas and the condensed $H_2O$ are exhausted from the gap 58 by a vent 60 disposed through the bottom of the insulated covering 56.

The catalytic combustor 26 is constantly supplied with $H_2$ and $O_2$. In this manner, costly regulation and monitoring components and algorithms are avoided. The catalytic combustor 26 provides a steady stream of hot exhaust gases and thus heat transfer. The exhaust gas temperature, however, is limited to 100° C. (373K). This can be controlled using increased air flow provided by a fan blower (not shown). The fan blower, operates cyclically to lower its energy consumption. Local over-heating resulting from temperature spikes are avoided by sufficient gas distribution within the gap 58. High temperature spikes are balanced as a result of the rapid and sufficient heat distribution within the gap 58 and through the high heat capacity of the fuel cell stack 12.

The fuel cell system 10 is operable in three main modes: park, start-up and normal operation. Operation of the fuel cell system 10 during each of these modes will be discussed in turn. Park mode is a cool-down period generally occurring after normal operation of the fuel cell system 10. As the fuel cell system 10 initially enters the park mode, boil off $H_2$ is exhausted through the flow regulator 28 and through the flow control device 32 where it is mixed with $O_2$. The $H_2/O_2$ mixture flows into the catalytic combustor 26 and exothermically reacts to generate heat. The heat initially maintains the temperature of the fuel cell stack 12 as the temperature of fuel cell system 10 drops to ambient.

As discussed above, the fuel cell stack 12 is maintained at a temperature above 0° C. (273K) to avoid freezing of residual $H_2O$. As the effectiveness of the original heat wears off and the temperature of the fuel cell stack 12 drops toward 0° C., the controller 34 switches on the heater 30 to heat the hydrogen source 14. As the hydrogen source 14 is heated, an increased pressure condition results and is detected by the pressure sensor 38. The flow regulator 28 again exhausts $H_2$ to the fuel cell stack 12 to induce a subsequent exothermic reaction. In this manner, as the temperature of the fuel cell stack 12 periodically dips toward 0° C. the fuel cell system 10 initiates the exothermic reaction in the catalytic combustor 26 to avoid sub-freezing temperatures. Although the freezing temperature of water at nominal conditions is 0° C., liquid water in the stack will typically have solids dissolved therein or be subject to pressure variation, resulting in the freezing temperature of water in the stack varying from the nominal value. Thus, the invention is exemplified based on the 0° C. reference for convenience, but a range around same is contemplated. Further, the method of the invention contemplates corrective measures as the temperature of the stack declines toward 0° C., and initiation of corrective measures near and slightly above the freezing temperature of water.

During the start-up mode, the initial temperature of the fuel cell stack 12 is presumably lower than the desired operating temperature. Although operation of the fuel cell stack 12 increases the temperature to the desired operating temperature, the fuel cell system 10 assists the temperature increase by feeding $H_2$ and $O_2$ into the catalytic combustor 26. As similarly described above, an exothermic reaction occurs within the catalytic combustor 26 resulting in a more rapid temperature increase. Because the catalytic combustor 26 is also in heat exchange relation with the coolant flow of the fuel cell stack 12, the heat generated by the reaction warms the coolant. The warmed coolant evenly distributes the heat through the fuel cell stack 12 to warm the fuel cell stack 12 to the desired operating temperature.

Once the fuel cell stack 12 is warmed to the desired operating temperature, as sensed by the temperature sensor 36, normal operation of the fuel cell system 10 ensues. That is to say, the flow regulator 28 is closed to inhibit $H_2$ flow into the catalytic combustor 26 through the flow control device 32. The controller 34 regulates operation of the compressors 16,18 and pump 20 to generate current from the fuel cell stack 12 and to maintain the fuel cell stack 12 at the desired operating temperature.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for modulating a temperature of one or more fuel cells in a fuel cell stack, comprising:
    a catalytic combustor in heat exchange relationship with the fuel cell stack, said catalytic combustor promoting an exothermic reaction;
    a hydrogen source;
    a pressure sensor, for monitoring a pressure of the hydrogen source;
    a temperature sensor, for monitoring the temperature of the fuel cell stack; and
    a flow regulator, modulated based on the pressure of said hydrogen source and the temperature of the fuel stack, selectively supplying hydrogen ($H_2$) from said hydrogen source to said catalytic combustor as the temperature of the fuel cell stack approaches 0° C. or below, said $H_2$ reacting with oxygen ($O_2$) in said exothermic reaction.

2. The system of claim 1, further comprising a heater that heats said hydrogen source to increase said pressure thereby increasing flow of said $H_2$ through said flow regulator.

3. The system of claim 1, wherein said flow regulator is a valve.

4. The system of claim 1, wherein said flow regulator is a relief valve.

5. The system of claim 1, further comprising a venturi nozzle through which said $H_2$ flows into said catalytic combustor, said venturi nozzle drawing in oxygen containing air to enable said exothermic reaction.

6. The system of claim 1, wherein said catalytic combustor lies adjacent to said fuel cell stack and includes a series of catalyst coated flow channels through which said $H_2$ and said $O_2$ flow.

7. The system of claim 1, wherein said catalytic combustor includes a plate having a catalyst layer that is offset from said fuel cell stack, wherein said $H_2$ and said $O_2$ flow over said catalyst layer to induce said exothermic reaction causing heat to radiate from said catalytic combustor to said fuel cell stack.

8. The system of claim 1, further comprising a jacket enclosing the fuel cell stack to form a gap between said jacket and the fuel cell stack, wherein hot exhaust from said catalytic combustor circulates through said gap to heat the fuel cell stack.

9. A method of modulating a temperature of a fuel cell stack, comprising:
    monitoring the temperature of the fuel cell stack;
    monitoring the pressure of a hydrogen source;
    inducing an increased pressure condition in a hydrogen source, wherein said inducing is performed by a heater;
    exhausting hydrogen ($H_2$) from said hydrogen source to relieve said increased pressure condition;
    feeding said $H_2$ to a catalytic combustor in heat exchange relationship with the fuel cell stack;
    oxidizing said $H_2$ in said catalytic combustor in an exothermic reaction to generate heat; and
    transferring said heat to the fuel cell stack to vary the temperature thereof.

10. The method of claim 9, wherein said step of feeding $H_2$ into said catalytic combuster is based on the temperature of the fuel cell stack.

11. The method of claim 10, wherein said step of feeding $H_2$ into said catalytic combuster occurs when the temperature is at or below about 0°0 C.

12. The method of claim 9, further comprising monitoring the temperature of the fuel cell stack, wherein said step of inducing an increased pressure condition is based on the temperature of the fuel cell stack.

13. The method of claim 9, wherein said step of inducing an increased pressure condition in said hydrogen source occurs when the temperature of the fuel cell stack is at or below about 0° C.

14. The method of claim 9, further comprising:
    channeling said $H_2$ through a venturi nozzle; and
    drawing oxygen-containing air through said venturi nozzle to mix with said $H_2$.

15. The method of claim 9, further comprising:
    feeding heat transfer fluid into fluid channels of the fuel cell stack; and
    circulating said heat transfer fluid within said fluid channels to regulate the temperature.

16. The method of claim 15, wherein said heat transfer fluid acts as a medium to achieve said step of circulating said heat within the fuel cell stack to vary the temperature thereof.

17. The method of claim 16 wherein said heat transfer fluid is a coolant.

18. The method of claim 10 wherein said fuel cell stack comprises a plurality of fuel cells, and said monitoring of said temperature of said fuel cell stack is accomplished by monitoring the temperature of one or more of said fuel cells.

* * * * *